United States Patent [19]

Barnes et al.

[11] Patent Number: 5,599,573
[45] Date of Patent: Feb. 4, 1997

[54] PREPARATION OF ACIDIFIED PASTAS

[75] Inventors: Gale J. Barnes, Woodbury; David Collins-Thompson, New Milford; Jau Y. Hsu, Brookfield, all of Conn.

[73] Assignee: Nestec S.A., Vevey, Switzerland

[21] Appl. No.: 456,161

[22] Filed: May 31, 1995

[51] Int. Cl.$^6$ .................................................. A23L 1/16
[52] U.S. Cl. .................. 426/451; 426/128; 426/324; 426/325; 426/401; 426/557
[58] Field of Search ...................... 426/557, 451, 426/510, 511, 324, 325, 128, 401, 520, 521

[56] References Cited

U.S. PATENT DOCUMENTS

| | | | |
|---|---|---|---|
| 3,537,862 | 11/1970 | Peters et al. | 426/557 |
| 4,243,690 | 1/1981 | Murakami et al. | 426/557 |
| 4,368,210 | 1/1983 | Murakami et al. | 426/557 |
| 4,370,352 | 1/1983 | Murakami et al. | 426/557 |
| 4,529,609 | 7/1985 | Gachring et al. | 426/532 |
| 4,597,976 | 7/1986 | Doster et al. | 426/325 |
| 4,599,238 | 7/1986 | Saitoh et al. | 426/557 |
| 4,659,576 | 4/1987 | Dahle et al. | 426/324 |
| 4,675,199 | 6/1987 | Hsu | 426/557 |
| 4,734,291 | 3/1988 | Raffensperger | 426/325 |
| 4,789,553 | 12/1988 | McIntyre et al. | 426/325 |
| 4,828,852 | 5/1989 | Hsu et al. | 426/94 |
| 4,990,349 | 2/1991 | Chawan et al. | 426/243 |
| 5,057,330 | 10/1991 | Lee et al. | 426/120 |
| 5,063,072 | 11/1991 | Gillmore et al. | 426/557 |
| 5,151,289 | 9/1992 | Ozahki et al. | 426/557 |
| 5,256,435 | 10/1993 | Cuperus | 426/557 |
| 5,294,452 | 3/1994 | De Francisci | 426/496 |
| 5,332,587 | 7/1994 | Howard et al. | 426/128 |

FOREIGN PATENT DOCUMENTS

0626137A1  11/1994  European Pat. Off. .

*Primary Examiner*—Esther Kepplinger
*Assistant Examiner*—Lien Tran
*Attorney, Agent, or Firm*—Vogt & O'Donnell, LLP

[57] ABSTRACT

An acidified pasta product is prepared by mixing a farinaceous material, an edible acid and water to obtain an acidified dough, forming the acidified dough into a shape to obtain a raw acidified pasta product, steaming the raw pasta product to surface-gelatinize the raw pasta product to obtain a surface-gelatinized pasta product, contacting the surface-gelatinized product with water to obtain a wet acidified pasta product, steaming the wet product for cooking the wet product to obtain a steam-cooked acidified pasta product and packaging the steam-cooked product to obtain a packaged acidified pasta product.

17 Claims, No Drawings

PREPARATION OF ACIDIFIED PASTAS

BACKGROUND OF THE INVENTION

The present invention relates to the preparation of pastas and more particularly to the preparation of pre-cooked, shelf-stable or refrigerated, acidified pasta products.

Traditionally, shelf-stable or refrigerated pre-cooked/acidified pastas are prepared by boiling pastas (raw/wet or dried) in acidified water, coating with oil followed by packaging and heat processing with steam or boiling water (for example, a product temperature of 90°–95° C. for about 10–20 minutes). In some cases, the pasta products are sterilized at higher temperatures (for example 104° C.) using a shorter processing time. Various kinds of acids and combinants are used in the pasta acidification process to obtain a pH of the pastas below 4.6 and a low acid taste. Although this boiling-in-acidified water process is the quickest way to cook and acidify pastas, it has some drawbacks.

1) Firstly, cooking pasta in boiling water has a cooking loss problem, especially if the temperature of boiling water is not high enough (for example, not above 97° C.) and this results in poor pasta texture. Controlling the cooking water temperature is difficult because it is related to the amount and temperature of the pasta cooked.
2) Secondly, continuous cooking of pastas in the same acidified water requires constant feeding of fresh water and acid and this is not only cumbersome, but it also requires constant monitoring of water acidity.

In recent years, there have been patented several processes in which it has been tried to eliminate the acidic boiling process and utilize the final healing step for acidification (post-packaging heating, so called in-pack-pasteurization) which is commonly used in pre-cooked/acidified pasta processes for pasta cooking. For example, U.S. Pat. No. 4,734,291 describes a process which does not use acidified water boiling for pasta cooking, but instead, regular raw/wet pastas are steamed first to give partially cooked pastas, then a certain amount of acidic water is added to the partially cooked pastas, which are finally packaged and heat processed (equivalent to 104° C. for about 10 minutes). U.S. Pat. No. 5,057,330 describes a process in which pastas are cooked by boiling but not in acidic water, after which a certain mount of acidic water is added to the pastas which are finally packaged and heat processed and wherein alkaline neutralizing agents such as sodium bicarbonate are provided to neutralize the acid taste during consumption.

The above-mentioned patents describe processes which attempt to eliminate or reduce the cumbersome process of cooking pastas in acidic water. Ideally, direct acidification of a pasta dough without any further acidification step needed is desirable. For example, U.S. Pat. No. 4,597,976 describes a process using direct addition of acids to the pasta dough which is then formed into pasta shapes by either extrusion or sheeting/slitting, the extruded or sheeted/slitted, raw, wet or dried, acidified pastas are then cooked in regular water, the cooked pastas are then steamed to a temperature of at least 85° C., then packaged with acidified sauce and heat processed again under conditions equivalent to about 10 minutes at 93° C. Although in this process the pastas are not cooked in acidic water, a water boiling step is still used. Also, in this process the raw/wet pastas are not steamed first before boiling in order to prevent leaching of pasta starch and acid, and the absence of this steaming step, therefore, results in a reduction of pasta acidity as well as poor cooked pasta texture. There is a need for a simple process involving direct acidification of pasta dough while also retaining cooked pasta acidity and good texture.

SUMMARY OF THE INVENTION

Instead of cooking acidified, raw/wet pastas in boiling water as in the process of U.S. Pat. No. 4,957,976 we have developed a process in which raw/wet pastas to which edible acid has been added are steamed a first time and then treated with water, and then steamed a second time followed by packaging, in a container or packaging may be effected by packaging under modified atmospheric conditions or by packaging and heat processing to pasteurize the product. The first step steaming provides surface cooked pastas which may be portioned and then treated with water to provide sufficient moisture for cooking which is carded out by the second step steaming.

According to the present invention there is provided a process for the preparation of a pre-cooked shelf-stable or refrigerated acidified pasta product comprising mixing pasta ingredients together with edible acid added to prepare a pasta dough, forming a raw/wet pasta from the pasta dough, steaming the raw/wet pasta a first time and then treating the steamed raw/wet pasta with water, afterwards steaming the pasta a second time and finally packaging.

If desired, the twice steamed pasta may be treated with additional water either
a) by spraying the water onto the pasta or immersing the pasta in the water followed by packaging and heat processing or
b) by placing the pasta in a package, adding the water to the pasta in the package and then heat processing. This water addition to the twice steamed pasta followed by heat processing can enable the production of a cooked pasta with a moisture content of from 50 to 70% by weight regardless of the pasta thickness and the water absorption property.

DETAILED DESCRIPTION OF THE PREFERRED EMBODIMENTS

The raw/wet pasta is obtained from a pasta dough to which an edible acid has been added, the pasta dough having been prepared from a farinaceous ingredient, an edible acid and water, with or without one or more additives, to form a dough, and forming the dough under pressure by conventional methods such as sheeting, kneading or extrusion into a variety of sizes and shapes, e.g. ravioli, spaghetti, macaroni, noodles and the like. The farinaceous ingredient may be one or more of durum semolina, rice flour, buckwheat flour, durum flour, regular wheat flour, whole wheat flour, farine flour, corn flour or starch material, depending on the type of pasta product desired. Generally, semolina and durum flour are preferred for extruded pasta, such as spaghetti, macaroni, etc., while durum or wheat flour are preferred for sheeted pasta, such as noodles. The farinaceous ingredient is usually present in an amount of from 75 to 85% of the dry ingredient mixture depending on the variety and particle size. The amount of water present in the dough is normally from 15 to 35% by weight based on the total weight of the dough.

Wheat gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks and/or liquid whole eggs, may if desired, be included in the ingredient mix at levels up to about 5.5% by weight for dry products and up to about 22% by weight for liquid products, based on the weight of the dry ingredient mix. Whole eggs and egg yolks generally are used in the production of noodles, while dried egg whites are generally used in the production of spaghetti. In addition, glyceryl monostearate may, if desired, also be included in the ingredient mix, particularly in the production of extruded pasta, to improve firmness, reduce stickiness and minimize absorption of water from the sauce component by the pasta. If used, the glyceryl monostearate preferably is present in amounts of from 0.5 to 2% by weight of the dry ingredient mix. It is to be understood that wheat gluten, eggs, and glyceryl monostearate are optional ingredients in the dry mix and are not essential in the production of the pasta component.

If desired, seasonings, spices or flavourings such as meat, chicken or beef flavours, may be added to the pasta dough, e.g. in amounts of from 0.1 to 5% by weight based on the total weight of the pasta.

The raw/wet pasta which is steamed the first time may be a sheeted pasta, a sheeted/slitted pasta, or an extruded pasta all of which may have been cut to the desired size.

The steaming of the raw/wet pasta the first time may be carried out using saturated steam or steam at atmospheric condition, e.g. at a temperature from 85° to 100° C. and conveniently from 90° to 95° C. for a period of from 1 to 5 minutes, preferably from 1.5 to 3.5 minutes. The first step steaming cooks or gelatinises at least part of the surface of the pasta, e.g. at least 50% and preferably substantially all the surface of the pasta.

The pasta steamed the first time is then treated with water in order to provide sufficient moisture to the pasta to enable subsequent cooking of the pasta by steaming a second time, e.g. from 30 to 60% by weight. The treatment with the water may be carried out using cold or hot water from just above freezing point, e.g. from 0.5° C. up to 60° C., preferably from 15° C. to 40° C. and most preferably from 20° to 35° C. Ambient temperatures are the most convenient. The duration of the contact with the water may be for a period of time from, for instance, 0.1 second to 5 minutes, preferably from 0.2 seconds to 1 minute and more preferably from 0.5 seconds to 1 minute. The treatment of the steamed pastas with the water may be performed either by spraying the pastas with the water or by immersing the pastas in the water.

The amount of edible acid that is added to the ingredients of the raw/wet pasta before steaming should be sufficient to provide the pasta with a pH of less than 5, preferably less than 4.6 and especially from 4.0 to 4.4. The amount of edible acid present in the pasta product is usually from 0.1 to 2.5%, preferably 0.2 to 2% and especially from 0.5 to 1.5% by weight based on the total weight of the pasta.

Any acid, organic or inorganic, which is suitable for use in foods and which is soluble in water may be used, such as citric, fumaric, lactic, malic, acetic, tartaric, sulfuric, hydrochloric and phosphoric acids. The acid used must not impart to the pasta a taste which is incompatible with the other components of the product at the desired pH level. Malic acid, lactic acid, citric acid and acetic acid, e.g. vinegar, have been found to be particularly well suited for use in acidification of the pasta component.

When the edible acid is added to the dough ingredients of raw/wet pasta before steaming, the pasta dough is formed by blending the edible acid with the farinaceous ingredient, optionally with other ingredients such as dehydrated or liquid egg material, wheat gluten, propylene glycol alginate, glyceryl monostearate, and adding sufficient water if necessary to form a suitable dough. Some or all of the water may be present in one or more of the ingredients, e.g. liquid egg or acid solution. Generally, water is present in the mix in such quantity as to produce a dough containing from about 15% to 35% moisture.

After the water treatment of the pasta steamed the first time, the pasta is steamed a second time to substantially cook the pasta. The steaming of the pasta the second time may be performed in a similar manner to steaming the first time, viz. using saturated steam or steam at atmospheric condition, e.g. at a temperature from 85° to 100° C. and conveniently from 90° to 95° C. for a period of from 1 to 5 minutes, preferably from 1.5 to 3.5 minutes. The moisture content of the pasta steamed a second time is usually from 50 to 70% by weight.

After steaming the second time, as stated above, the pastas may optionally be treated with water a second time in a similar manner to that described above for the water treatment, e.g. by spraying the pastas with water or immersing the pastas in the water followed by packaging or by addition of water to the pastas which have already been placed in the package. The subsequent heat processing may then substantially complete the cooking.

Before packaging, the pastas are advantageously coated with edible oil to inhibit sticking. The oil may advantageously be coated onto the pasta by spraying. The oil should have a melting point below 40° C., preferably below 35° C. and is advantageously a vegetable oil, e.g. soybean oil, peanut oil, olive oil, sunflower oil, safflower oil, canola oil or any combination thereof. The amount of oil coated onto the pasta may be from 0.5 to 8%, preferably from 1 to 5% and especially from 1.5 to 3% by weight based on the weight of the pasta.

The pastas are finally packaged in suitable containers, e.g. cans, glass jars or plastics pouches. After sealing, the containers may be heat processed to pasteurise the product (in-pack pasteurisation) and render it shelf-stable. In accordance with the present invention, the containers and contents may be heat processed under atmospheric conditions which provide a sterilizing value equivalent to 10 minutes at 93° C. For example, a commercially pasteurised product may be produced by processing the sealed containers for from 10–20 minutes in hot water or steam at 90°–95° C. Upon completion of heat processing, the containers are rapidly cooled to a temperature of about 45° C. or below in order to preserve the texture of the products.

Alternatively, the pastas are packaged under modified atmospheric condition, preferably at ambient temperature. The modified atmosphere may comprise nitrogen alone or a mixture of nitrogen and carbon dioxide as is conventionally used, e.g. a ratio of $N_2$ to $CO_2$ of 80:20, 65:35 or 50:50.

The pastas produced by the process of the present invention retain cooked acidity and have an improved texture when compared with traditional pre-cooked/acidified pastas. Another advantage of the present invention is that because the pastas are not cooked in hot water, any flavoring, seasoning or spice that is added is retained to a much greater degree than in traditional processes where cooking is performed in hot water and leaching of the flavours into the cooking water takes place.

EXAMPLES

The following Examples further illustrate the present invention. Parts and percentages are given by weight unless otherwise stated.

Example 1

A pasta dough was prepared by mixing 69.3 parts durum flour, 15.2 parts liquid whole egg, 14.7 parts water and 0.8 parts lactic acid (85% concentration). This pasta dough was sheeted to 1 mm thick, slitted to 1.7 mm wide and cut to 15.2 cm long. These pastas were divided into 3 groups (A, B and C) and processed by 3 different methods:

A  Raw pastas → boiled in water for 20 seconds → 55% pasta moisture
B  Raw pastas → dried to 12% moisture → boiled in water for 90 seconds → 56% pasta moisture
C  Raw pastas → steamed 2.5 min (90°–95° C. steam) → immersed in water for 40 seconds → steamed 2.5 minutes → 55% pasta moisture The A, and B processes were similar to the process of U.S. Pat. No. 4,597,976 while C was a process of the present invention. Comparison of samples prepared from these 3 processes showed the following results in Table 1

TABLE 1

| Samples | Pasta pH | Pasta Firmness and Stickiness |
|---|---|---|
| A | 4.68 | sticky and less firm |
| B | 4.95 | sticky and less firm |
| C | 4.26 | less sticky and more firm |

These results showed that the pastas of the process of the present invention retained acid better and the cooked pastas also had a better texture.

Example 2

A pasta dough was prepared by mixing 74 parts durum flour, 15.5 parts liquid whole egg and 10.5 parts distilled white vinegar (15% strength). This pasta dough was sheeted to 1.0 mm thick, slitted to 1.7 mm wide and cut to 15.2 cm long. These pastas were steamed at 90°–95° C. temperature under atmospheric conditions for 2.5 minutes, immersed in water for 30 seconds, then steamed again for another 2.5 minutes, coated with 2% soy bean oil and packaged in amounts of 150 g under two different conditions as follows:

a) Under modified atmospheric conditions (65% $N_2$/35% $CO_2$) and no further heating (MAP), b) Not under modified atmospheric conditions, but the packaged pastas went through in-pack pasteurization by heating 15 minutes in 90°–95° C. steam (IPP).

Both these processed pastas had a moisture content of 54% and a pH of 4.6. Accelerated storage tests of each of these samples in duplicate were conducted (30° C./60 days).

At the completion of accelerated storage after 60 days, no microbiological growth was observed, and the results indicated that these pasta products prepared in accordance with the process of the present invention (IPP or MAP samples) had a good shelf life.

We claim:

1. A process for the production of an acidified pasta product comprising mixing a farinaceous material, an edible acid and water to obtain an acidified dough, forming the acidified dough into a shape to obtain a raw acidified pasta product, steaming the raw pasta product to surface-gelatinize the raw pasta product to obtain a surface-gelatinized acidified pasta product, contacting the surface-gelatinized product with water to obtain a wet acidified pasta product, steaming the wet product for cooking the wet product to obtain a steam-cooked acidified pasta product and packaging the steam-cooked product to obtain a packaged product.

2. A process according to claim 1 wherein the surface-gelatinized product is contacted with water having a temperature of from 0.5° C. to 60° C.

3. A process according to claim 1 or 2 wherein the edible acid is mixed in an amount so that the acidified dough has a pH of less than 5.

4. A process according to claim 1 or 2 wherein the edible acid is mixed in an amount so that the acidified dough has a pH of from 4.0 to 4.6.

5. A process according to claim 1 wherein the edible acid is selected from the group consisting of citric, fumaric, lactic, malic, acetic, tartaric and phosphoric.

6. A process according to claim 1 wherein the edible acid is selected from the group consisting of sulfuric and hydrochloric.

7. A process according to claim 1 further comprising mixing wheat gluten with the farinaceous material, edible acid and water.

8. A process according to claim 7 wherein, by weight, the wheat gluten is mixed in an amount of about 2% to 20% based on a weight of the farinaceous material.

9. A process according to claim 1 wherein the surface-gelatinized product is contacted with water so that, by weight, the wet product has a moisture content of from 30% to 60%.

10. A process according to claim 1 further comprising packaging the steam-cooked product together with water.

11. A process according to claim 10 further comprising heating the packaged product to pasteurize the packaged product.

12. A process according to claim 1 wherein the steam-cooked product is packaged under a nitrogen atmosphere.

13. A process according to claim 1 or 12 further comprising, prior to packaging the steam-cooked product, coating the steam-cooked product with an edible oil.

14. A process according to claim 1 further comprising contacting the steam-cooked product with water.

15. A process according to claim 14 wherein the steam-cooked product is contacted with water so that, by weight, the steam-cooked product has a moisture content of from 50% to 70%.

16. A process according to claim 1 wherein the surface-gelatinized product is sprayed with water for contacting the surface-gelatinized product with water.

17. A process according to claim 1 wherein the surface-gelatinized product is immersed in water for contacting the surface-gelatinized pasta with water.

* * * * *